United States Patent [19]

Tsunazawa et al.

[11] 4,070,112

[45] Jan. 24, 1978

[54] SPECTROPHOTOMETER

[75] Inventors: Yoshio Tsunazawa; Shosuke Tezuka; Rikuo Hira, all of Kyoto, Japan

[73] Assignee: Shimadzu Seisakusho Ltd., Kyoto, Japan

[21] Appl. No.: 696,901

[22] Filed: June 17, 1976

[30] Foreign Application Priority Data

July 22, 1975 Japan .................. 50-101886

[51] Int. Cl.² .................. G01J 3/42
[52] U.S. Cl. .................. 356/96; 356/51
[58] Field of Search .......... 356/51, 88, 89, 93–97; 250/212, 574

[56] References Cited

U.S. PATENT DOCUMENTS

2,984,146  5/1961  Kwart et al. .................. 356/51
3,912,393  10/1975  Hossom et al. .................. 250/574

Primary Examiner—F. L. Evans
Attorney, Agent, or Firm—Fidelman, Wolffe & Waldron

[57] ABSTRACT

A spectrophotometer which uses as a detector a silicon photocell and a phototube sensitive to short wavelengths. The light from the sample cell is divided into a smaller and a larger portion. The smaller portion is projected onto the silicon photocell and the larger portion, to the phototube. The two outputs are combined and amplified for indication. The whole of the light transmitted through the sample cell may also be projected to the phototube while the spectrophotometer operates in the short wavelength region and alternatively to the silicon photocell while the instrument operates in the long wavelength region.

14 Claims, 9 Drawing Figures

SPECTROPHOTOMETER

This invention relates to a spectrophotometer which is capable of covering a wide spectral range from the ultraviolet to near infrared regions.

When a spectrophotometer is to be designed which can measure wavelengths from, say, about 190 to 1000 nm or, from 320 to 1000 nm, no single detector suffices to cover such a wide spectral range.

In the prior art, in order to cover a wide spectral range it has been customary to use a combination of two kinds of photocathodes which have different spectral responses, for example, the Sb-Cs (S-4 or S-5) or bialkali metal photocathode sensitive to wavelengths below 650 nm and the Ag-O-Cs (S-1) photocathode sensitive to longer wavelengths above 600 nm.

In one case two separate phototubes of different spectral responses have been alternatively used, and in another a "wide spectral range" phototube has been used. The latter phototube is provided in a single envelope with two photosensitive surfaces, one for shorter wavelengths and formed as a semi-transparent layer deposited on the inner surface of the front window of the envelope and the other for longer wavelengths and formed on the rear surface of the envelope.

The S-1 surface sensitive to long wavelengths, however, has a very low quantum efficiency of about 0.1 to 0.5% and consequently a very low sensitivity. In addition, it has a large amount of dark current. These are serious disadvantages.

In recent years solar batteries or silicon photocells have come into wide use in various electronic measuring instruments. Generally speaking, the conventional phototube of the S-5 type has a high sensitivity in the short wavelength region while the silicon photocell has a high sensitivity in the middle and high wavelength regions. Advantageously, the silicon photocell has little or no dark current.

Accordingly, the primary object of the invention is to provide a spectrophotometer wherein in order to cover a wide spectral range two detectors of different spectral-sensitivity or response characteristics are used, one of which is the silicon photocell highly sensitive in the middle and high wavelength regions and the other is a conventional phototube specifically designed for use in the short wavelength region.

In one embodiment of the invention, both the silicon photocell and the phototube are simultaneously used. In this case, however, the light from the sample is divided into two portions of different quantities, which are distributed between the photocell and the phototube and the outputs from the two detectors are combined for indication. If necessary, the outputs from the two detectors are amplified individually by different amplification degrees before they are combined.

In another embodiment of the invention, the silicon photocell and the phototube are alternatively used. While the spectrophotometer is used in a short wavelength region, the phototube is in operative condition and while the instrument is used in a long wavelength region, photocell is placed in operative condition, with the change from one of the two detectors to the other being effected at a suitable point intermediate the two wavelength regions.

The invention with its features and advantages will be clearly understood from the following course of description with reference to the accompanying drawings, wherein like reference numerals and symbols in different figures denote corresponding parts and wherein.

Figure 1:
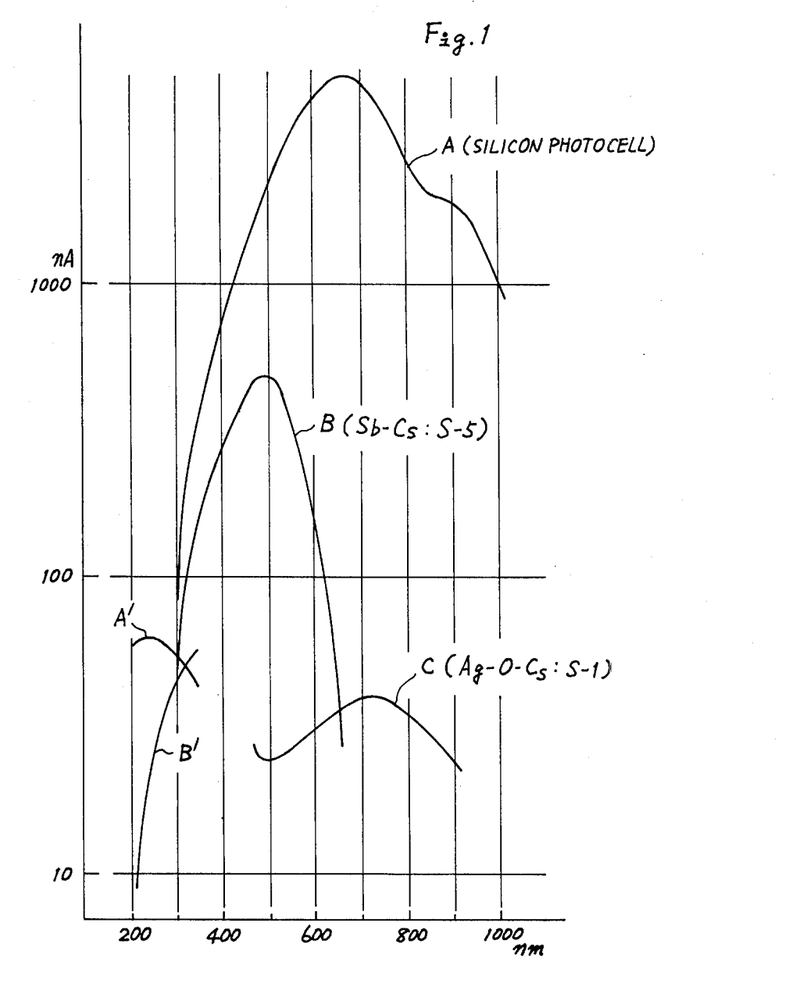
FIG. 1 is a graph showing the spectral-response curves of a silicon photocell and two conventional phototube.

Referring now to FIG. 1, which shows the actually measured values of the photoelectric currents produced by three different photoelectric elements, with a tungsten lamp as the light source above 350 nm and a deuterium lamp below it. The curves A and A' are obtained from a silicon photocell, the curves B and B', from a phototube having the S-5 (Sb-Cs) surface sensitive in a short wavelength region; and the curve C, from a phototube having the S-1 (Ag-O-Cs) surface for a long wavelength region.

As is clearly shown, the silicon photocell has the same or higher degree of sensitivity than the phototubes in the region of 320 to 1000 nm. Particularly, above 600 nm the photocell has a very high sensitivity which is about one hundred times that of the S-1 phototube. Moreover, the silicon photocell has little dark current. In this respect the silicon photocell is superior to the phototube.

Although the silicon photocell has a higher sensitivity than the phototube over the whole wavelength range covered by the photocell, it has such a low sensitivity in the ultraviolet region that it is practically very difficult to use the silicon photocell in that region. In the visible region the silicon photocell gives so great a difference in sensitivity between the short and long wavelength regions that much stray light is introduced in measurement in the short wavelength region. In other words, although in the short wavelength region of 320 to 400 nm the silicon photocell has much the same degree of sensitivity as the phototube, it has a far higher sensitivity in the long wavelength region so that the long wavelength components of the stray light contained in the light being measured are exaggerated with a resulting relative increase in stray light.

An experiment has disclosed that in the short wavelength region the output from the silicon photocell caused by stray light is about 10 times greater than the phototube with the S-5 cathode sensitive in the short wavelength region. Such an increase in stray light greatly reduces the measuring precision and accuracy of a spectrophotometer.

In view of the fact that as shown in FIG. 1, above 600 nm the silicon photocell has a sensitivity about 10 times as high as the phototubes for the short wavelengths (such as S-5 type) and 100 times as high as the phototubes for the long wavelengths (such as the S-1 type), in one embodiment of the invention the amount of light to be measured is to be projected onto the silicon photocell is reduced to, say, about one-tenth of the amount to be projected onto the short wavelength phototube so that stray light may be reduced to about one-tenth of the amount which would otherwise be introduced into the light measuring system.

In this arrangement, a loss of the amount of light to be measured is caused to the short wavelength phototube. However, such a loss is about 10% and is practically negligible since it is much the same as the fluctuation or variation of the sensitivity in individual phototubes. Since the silicon photocell has a very high sensitivity in the long wavelength region, the 10% of the light from the sample distributed to the photocell suffices for proper measurement, and with the sensitivity having been reduced to one-tenth of the normal value, the adverse effect which the long wavelength components of the stray light have on the results of measurement in the short wavelength region is also reduced to one-tenth of that which otherwise be caused.

Figure 2:
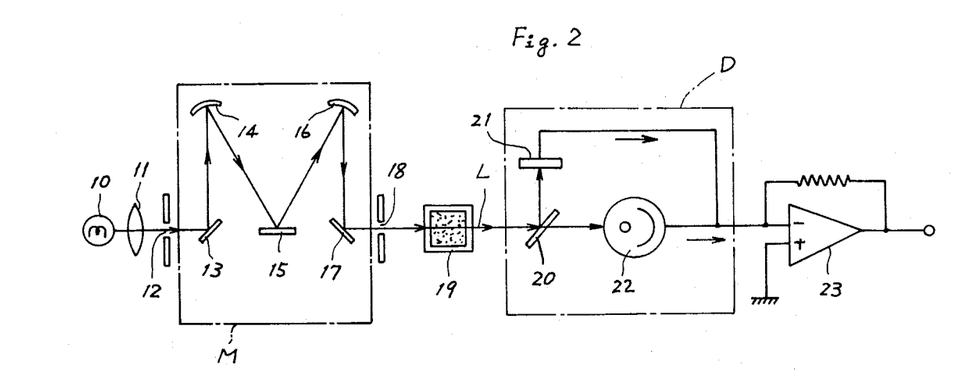
FIG. 2 is a schematic diagram of a single-beam spectrophotometer embodying the invention.

Turning now to FIG. 2, which somewhat schematically shows one embodiment of the invention, the light from a source 10 is focussed by a lens 11 at an entrance slit 12 of a monochromator M, in which a plane mirror 13 reflects the light entered through the slit 12 onto a collimating mirror 14 which renders the light parallel and directs it onto a grating 15. The diffracted light is converged by a concave mirror 16 and then reflected by a plane mirror 17 to be passed through an exit slit 18. The monochromatic light is projected onto a sample cell 19.

The light L transmitted through the cell 19 is led to a light measuring device D which comprises a beam divider 20, a silicon photocell 21 and a phototube 22 suited for the short wavelength region. The light hits on the divider 20, which reflects about 10% of the light received onto the silicon photocell 21 and transmits the remaining about 90% of the light onto the phototube 22. The outputs from the two detectors 21 and 22 are combined and applied to an amplifier 23. The divider 20 may comprise a simple glass or quartz plate.

With the above arrangement, in the short wavelength region the silicon photocell 21 contributes little to the function of the light measuring device D while in the long wavelength region the phototube 22 contributes little to the function of the light measuring device D. This means that it is possible by mere combination or summation of the outputs from the two detectors 21 and 22 to automatically change from one of the two detectors to the other and thereby to make operative that one of the detectors which has a spectral response most suited for the wavelength region being used without the necessity of using any mechanical changing device. The two detectors 21 and 22 operate as if they were a single detector, and by appropriately selecting the reflective ratio of the surface of the divider 20 it is possible to freely change or adjust the spectral response characteristics of the light measuring device D over the whole wavelength range of the light to be measured.

Figure 3:
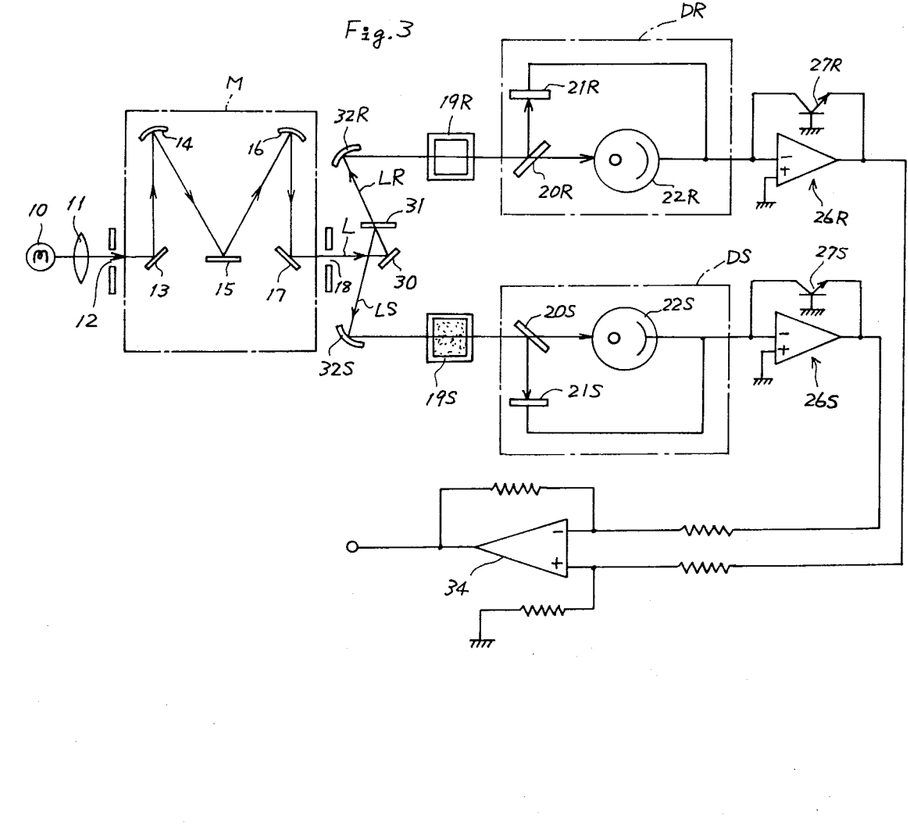
FIG. 3 is a schematic diagram of a double-beam spectrophotometer embodying the invention.

The principle of FIG. 2 may be applied to a double-beam spectrophotometers as schematically shown in FIG. 3. The monochromatic light L from a monochromator M is reflected by a plane mirror 30 and then split by a beam splitter 31 into two beams LR and LS. The beam LR is directed by a concave mirror 32R onto a cell 19R adapted to contain, say, a reference material, while the other beam LS is directed by a concave mirror 32S onto a cell 19S adapted to contain a sample material.

The light LR transmitted through the reference cell 19R enters a light measuring device DR while the light LS transmitted through the sample cell 19S enters a light measuring device DS. The two light measuring devices are of the same construction and operate in the same way as the device D shown in FIG. 2, with the corresponding component elements being designated by the same numerals suffixed by R and S, respectively.

The outputs of the light measuring devices DR and DS are applied through logarithmic amplifiers 26R and 26S, respectively, to a suitable circuit 34 designed to produce an output corresponding to a difference between the logarithmic of the amplifiers 26R and 26S. The output of the amplifer 34 is used for indication as is well known in the art.

Figure 4:
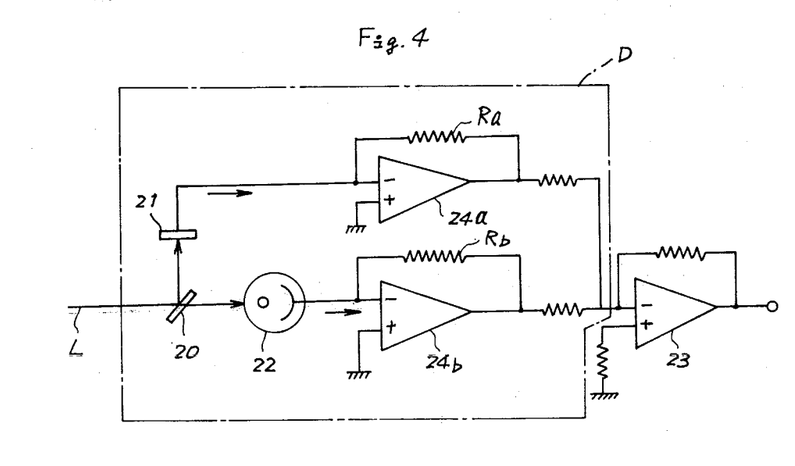
FIG. 4 is a modified form of FIG. 2 or 3.

A modified form of the light measuring device D of FIG. 2 or 3 is shown in FIG. 4, wherein the outputs from the photocell 21 and the phototube 22 are amplified by individual amplifiers 24a and 24b before they are combined. This arrangement enables adjustment of any difference between the absolute sensitivities of the two detectors 21 and 22 by appropriately setting the gains of the individual amplifiers 24a and 24b by means of feedback resistors Ra and Rb. The resistors Ra and Rb may be of the variable type so that the gains may be changed as desired. For example, if the absolute sensitivity of the silicon photocell 21 is sufficiently high, the divider 20 first optically distributes the light from the sample cell 19 to the phototube 22 and the photocell 21 by the distribution ratio of 9 to 1, and then electrically the amplifiers 24b and 24a amplify the outputs from the phototube 22 and the photocell 21 individually, with the ratio of the amplification degree of the amplifier 24b to that of the amplifier 24a having been set to 10 to 1. This results in the overall weighing ratio of the phototube to the photocell becoming 90 to 1.

By using the separate amplifiers for the outputs of the two detectors 21 and 22 before they are added it is possible to further reduce the influence of stray light caused by the silicon photocell. Although there is a great difference in the internal resistance between the photocell and the phototube, the provision of the two separate amplifiers enables use of the two elements in combination.

In the embodiments of FIGS. 2 to 4, the reflective ratio of the glass plate divider 20 is about 10% and the reflected light is applied to the photocell while the transmitted light is applied to the phototube. On the contrary, it is possible to use a mirror having a reflective ratio of 90% so that the reflected light is projected to the phototube and the transmitted light, to the photocell.

If the two detectors which have different sensitivities (that is, spectral-sensitivity characteristics and absolute sensitivities) from the detectors of the above example are to be used, the light distribution ratio by the divider 20 is different from the above-mentioned ratio of 9 to 1 and is determined to an appropriate ratio in view of stray light and the sensitivities of the detectors.

Figure 5:
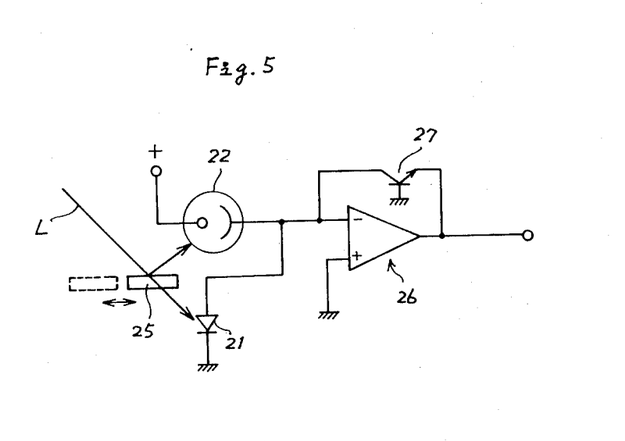
FIG. 5 is a schematic diagram of another embodiment of the invention.

Turning now to FIG. 5, which shows still another embodiment of the invention, the light L from the sample cell is projected onto a reflecting mirror 25 which is so arranged as to be selectively moved into and out of the path of the light L.

Both the output of a phototube 22 and the output of a silicon photocell 21 are connected to the inverting input terminal of an amplifier 26. A positive potential is applied to the anode of the phototube and both the negative electrode of the silicon photocell and the non-inverting terminal of the amplifier 26 are grounded.

The amplifier 26 has a negative feedback circuit in which a transistor 27 is connected for logarithmic transformation of the output of the amplifier 26. The logarithmic transformation provides a measure by which the subsequent operation can be performed by mere addition and subtraction.

With the negative feedback, the inverting terminal of the amplifier is hypothetically grounded and at zero level, so that the output current is taken out from the photocell 21 with the potential thereacross being zero, that is, under the short-circuited condition of the photocell. Such circuit connection provides a very good linearity of the output of the photocell with respect to the amount of incident light thereon.

When the spectrophotometer is used in the short wavelength region, the mirror 25 is positioned in the path of the light L to reflect the same onto the phototube 22. At a predetermined wavelength, say, 600 nm the mirror 25 is moved out of the optical path of the light L so that the light L is projected onto the photocell 21 in the long wavelength region above 600 nm.

Figure 6:
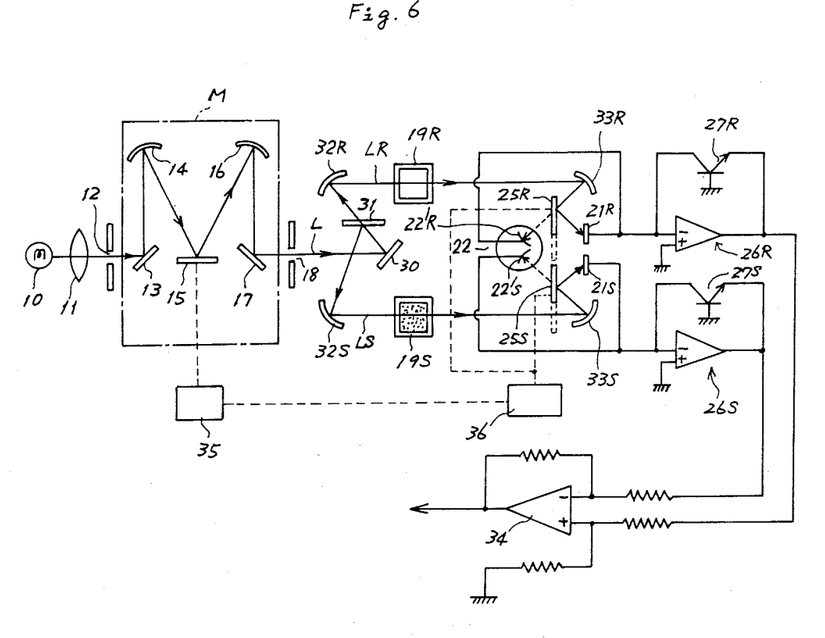
FIG. 6 is a schematic diagram of a double-beam spectrophotometer to which the principle as shown in FIG. 5 is applied.

FIG. 6 schematically shows a double-beam spectrophotometer to which the principle as shown in FIG. 5 is applied. The monochromatic light L from a monochromator M is reflected by a plane mirror 30 and then split by a beam splitter 31 into two beams LR and LS. The beam LR is directed by a concave mirror 32R onto a cell 19R adapted to contain, say, a reference material, while the other beam LS directed by a concave mirror 32S onto a cell 19S adapted to contain a sample matrial.

The light beam LR transmitted through the reference cell 19R is directed by a concave mirror 33R onto a plane mirror 25R which is movable selectively into and out of the optical path, thereby causing the beam LR to hit either a silicon photocell 21R or a photocathode 22'R. In a similar manner, the light beam LS from the sample cell 19S is directed by a concave mirror 33S onto a plane mirror 25S movable selectively into and out of the optical path, thereby causing the beam LS to impinge on either a silicon photocell 21S or a photocathode 22'S. The photocathodes 22'R and 22'S are encased in a single envelope to form a composite phototube 22.

The outputs from the two detectors are applied to logarithmic amplifiers 26R and 26S, respectively, the logarithmic outputs of which are applied to a subtracting circuit 34 to provide a ratio between the intensities of the light beams transmitted through the reference and sample cells.

A wavelength setting device 35 sets the grating 15 to a predetermined wavelength in a manner well known in the art, and in association with the device 35 a mirror control device 36 controls the movement of the mirrors 25R, 25S into and out of the path of the light beams LR, LS.

Figure 7:
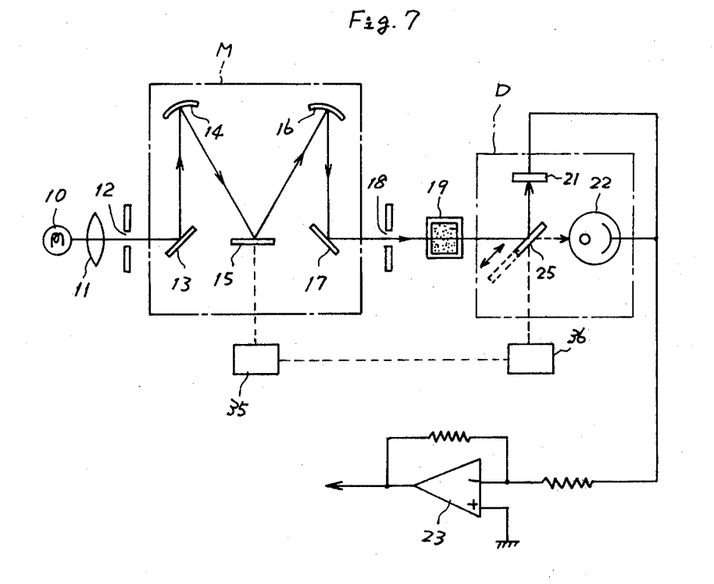
FIG. 7 is a schematic diagram of a single-beam spectrophotometer to which the principle of FIG. 5 is applied.

FIG. 7 is a schematic showing of a single-beam spectrophotometer to which the principle of FIG. 5 is applied. The construction and operation of the arrangement of FIG. 7 can be easily understood from the foregoing description so that no explanation will be given to FIG. 7.

Figure 8:
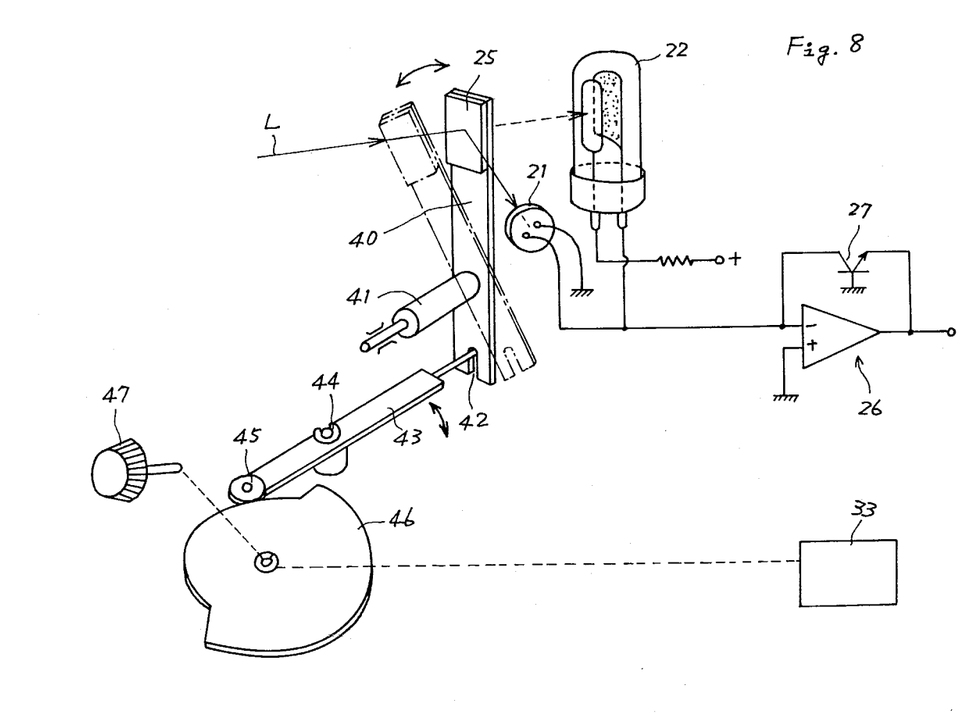
FIGS. 8 and 9 are schematic perspective views of the mechanisms for changing from one of the two detectors to the other, used in the embodiments of FIGS. 7 and 6, respectively.

FIG. 8 shows by way of example a mechanical arrangement of the mirror control device 36 used in FIG. 7. The mirror 25 is fixed to the upper end of a lever 40 swingable on a shaft 41, and a slot 42 is formed in the lower end of the lever 40. A lever 43 pivoted at 44 has its one end engaged in the slot 42 of the lever 40 and is provided at its opposite end with a cam follower 45 held in contact with the periphery of a cam 46.

A manually operable knob 47 is turned to set the grating 15 to a wavelength through the device 33 and at the same time to rotate the cam 46 to swing the lever 40 thereby to position the mirror in and out of the path of the light beam L as will be easily understood.

Figure 9:
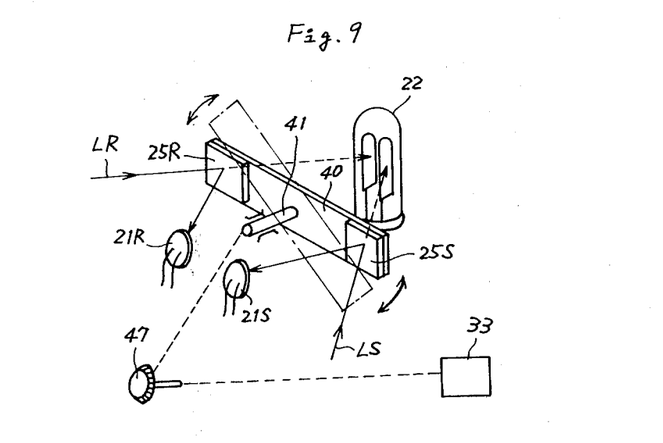

FIG. 9 shows by way of example the mirror control device 36 which can be used in FIG. 6. The mirrors 25R and 25S are fixed to the opposite ends of a lever 40 which can be turned on a shaft 41 by means of a knob 47 so as to position both of the mirrors 25R and 25S in and out of the path of the light beams LR and LS, respectively.

Suppose that in FIGS. 5 to 7 the silicon photocell be replaced by a conventional phototube sensitive in the long wavelength region. Although the long wavelength phototube is not operative while the instrument is used in the short wavelength region, it produces a great dark current to be added to the outout of the operating short wavelength phototube, with resulting introduction of great errors into the result of measurement. Therefore, separate amplifiers would have to be provided for the outputs from the long wavelength and short wavelength amplifiers, respectively, with resulting increase in the number of circuit components and consequently the manufacturing cost of the instrument.

On the contrary, in accordance with the invention, the phototube designed for the short wavelength region is employed for detection of short wavelengths and the solar battery is employed for detection of long wavelengths. Since these two detectors produce little or no dark current, the output from one of them is not influenced by the dark current which would otherwise be produced by the other which is not in operation, so that introduction of errors into the result of measurement can be avoided and the number of the circuit components becomes smaller than otherwise with resulting reduction of the manufacturing cost of the instrument. In particular, the use of the silicon photocell as a detector enables direct connection of a logarithmic amplifier to the output of the detector because the silicon photocell has little or no dark current. This is a great advantage.

What we claim is:

1. A spectrophotometer comprising: means for providing a monochromatic light at a sequence of wavelengths over a predetermined spectral range; a sample containing portion; a light measuring device including a first photoelectric element designed for use in the long wavelength portion of said spectral range, a second photoelectric element designed for use in the short wavelength portion of said spectral range; means for amplifying the electrical outputs from said first and second photoelectric elements and optical means for directing said monochromatic light through said sample containing portion to said light measuring device, said light measuring device comprising means for optically dividing the light from said sample containing portion into a first and a second portion and simultaneously projecting said first and second portions onto said first and second photoelectric elements, respectively.

2. The spectrophotometer of claim 1, wherein said first photoelectric element is a silicon photocell.

3. The spectrophotometer of claim 2, wherein said first portion of said light from said sample containing portion is of a relatively small quantity and said second portion is of a relatively large quantity.

4. The spectrophotometer of claim 3, wherein said first and second portion comprise 10% and 90%, respectively, of the whole quantity of the light from said sample containing portion.

5. The spectrophotometer of claim 3, wherein said amplifying means comprises a single amplifier to the input of which the outputs of said silicon photocell and said second photoelectric element are applied simultaneously.

6. The spectrophotometer of claim 3, wherein said amplifying means comprises two amplifiers to the input of one of which the output of said silicon photocell is applied and to the input of the other of which the output of said second photoelectric element is applied.

7. The spectrophotometer of claim 6, wherein the gains of said two amplifiers are individually variable.

8. The spectrophotometer of claim 1, wherein said optical dividing means comprises a glass plate.

9. The spectrophotometer of claim 1, wherein said optical dividing means comprises a quartz plate.

10. The spectrophotometer of claim 1, wherein said second photoelectric element is a phototube.

11. A spectrophotometer comprising: a monochromator; a sample cell to which the light from said monochromator is projected; a detector comprising a silicon photocell, a phototube sensitive in a predetermined short wavelength region and means for dividing the light from said sample cell into a small portion and the remaining large portion and projecting said small portion onto said silicon photocell and said remaining large portion onto said phototube simultaneously, the outputs of said photocell and said phototube being combined to form the output of said detector; and means for amplyfing said output of said detector.

12. The spectrophotometer of claim 11, wherein said detector further includes a pair of amplifiers of different gains one of which is connected to the output of said silicon photocell and the other is connected to the output of said phototube.

13. A spectrophotometer comprising: a monochromator; a pair of cells to which the light from said monochromator is projected; a pair of detectors each receiving the light from one of said cells and comprising a silicon photocell, a phototube sensitive in a predetermined short wavelength region and means for dividing said light from said one cell into a small portion and the remaining large portion and projecting said small portion onto said silicon photocell and said remaining large portion onto said phototube simultaneously, the outputs of said photocell and said phototube being combined to form the output of each said detector; and a pair of amplifiers each amplifying the output of one of said detectors.

14. The spectrophotometer of claim 13, wherein each of said pair of detectors further includes a pair of amplifiers of different gains one of which is connected to the output of said silicon photocell of one of said detectors and the other is connected to the output of said phototube of said one detector.

* * * * *